(12) United States Patent
Lebeck

(10) Patent No.: US 6,213,473 B1
(45) Date of Patent: Apr. 10, 2001

(54) DOUBLE GAS SEAL WITH COPLANAR PAD FACES

(75) Inventor: Alan O. Lebeck, Albuquerque, NM (US)

(73) Assignee: Utex Industries, Inc., Houston, TX (US)

( * ) Notice: Subject to any disclaimer, the term of this patent is extended or adjusted under 35 U.S.C. 154(b) by 0 days.

(21) Appl. No.: 09/265,224

(22) Filed: Mar. 6, 1999

(51) Int. Cl.[7] ........................................................ F16J 15/34
(52) U.S. Cl. .......................... 277/399; 277/387; 277/400; 277/401; 277/408
(58) Field of Search .................................. 277/387, 399, 277/400, 401, 408

(56) References Cited

U.S. PATENT DOCUMENTS

| | | |
|---|---|---|
| 1,876,515 | 9/1932 | Emmet . |
| 2,247,505 | 7/1941 | Kohler . |
| 2,265,953 | 12/1941 | Mortensen et al. . |
| 3,572,727 | 3/1971 | Greiner . |
| 3,675,935 | 7/1972 | Ludwig et al. . |
| 3,744,805 | 7/1973 | Heinrich . |
| 4,423,879 | 1/1984 | Takenaka et al. . |
| 4,461,487 | 7/1984 | Matsumoto . |
| 4,523,764 | 6/1985 | Albers et al. . |
| 5,066,026 | 11/1991 | Heck et al. . |
| 5,071,141 | 12/1991 | Lai et al. . |
| 5,246,295 | 9/1993 | Ide . |
| 5,385,409 | 1/1995 | Ide . |
| 5,498,007 | 3/1996 | Kulkarni et al. . |
| 5,558,341 | * 9/1996 | McNickle et al. .................... 277/401 |
| 5,664,787 | * 9/1997 | Fuse et al. ............................ 277/401 |
| 5,702,110 | * 12/1997 | Sedy ..................................... 277/401 |
| 5,713,576 | 2/1998 | Wasser et al. . |

OTHER PUBLICATIONS

Brochure: A. W. Chesterton Co., "New 4400 Gas Seal", Circle Reader No. 318.

* cited by examiner

*Primary Examiner*—Anthony Knight
*Assistant Examiner*—Enoch Peavey
(74) *Attorney, Agent, or Firm*—Browning Bushman

(57) ABSTRACT

A double gas pressure seal 10 is provided for sealing between a stationary housing 14 and a rotary housing 26. The gas pressure seal includes a stationary ring 42 and a rotary ring 40 each having a radially inner sealing face and a radially outer sealing face. A biasing spring 56 biases one of the rings toward the other ring. An annular groove 68 is provided in one of the rings, with the groove being spaced between the radially inner sealing faces and radially outer sealing faces. A supply port 84 supplies pressurized gas to the annular groove at a pressure higher than the process fluid in the stationary housing. A plurality of radially inner and radially outer recesses 94, 96, 122, 124 are provided on the one of the rings, and corresponding feed channels 98, 100, 126, 128 fluidly interconnect the annular groove with a rotary leading portion of each respective recess. A small quantity of pressurized gas escapes between the inner sealing faces to atmosphere and between the outer sealing faces to the process fluid sealed in the stationary housing.

20 Claims, 6 Drawing Sheets

DOUBLE GAS SEAL WITH COPLANAR PAD FACES

FIELD OF THE INVENTION

The present invention relates to gas-lubricated non-contacting seals and, more particularly, to a gas lubricated seal with radial coplanar pad faces. The gas seal of the present invention has various applications, and is particularly well suited for sealing between a rotating drive shaft sleeve and a pump housing, so that the double gas seal reliably seals process fluid within the pump housing.

BACKGROUND OF THE INVENTION

Gas lubricated seals have been used for many years in compressors and, in some applications, have largely replaced more conventional seals, including liquid lubricated seals. Since the sealing faces of gas lubricated seals are not in dynamic contact, properly designed gas lubricated seals offer significant benefits of reduced frictional torque and reduced heat generation compared to conventional seals. Moreover, since the high pressure gas supplied to a gas lubricated seal may be selected for its inert qualities in view of the application, and since a properly designed gas lubricated seal offers a long life, these seals are ideal for applications requiring complete emission control and process purity. In more recent years, gas lubricated seals have been applied to pump technology to seal between the rotating shaft sleeve and the pump housing. Accordingly, pump manufacturers have desired improved gas seals for various pump sealing applications.

One type of gas seal uses circumferentially spaced grooves in one of the sealing faces. The spiral grooves each extend radially inward from an outer periphery of the respective sealing face. Pressurized gas is supplied to these grooves to block the escape of the fluid being sealed. One such gas lubricated seal which is embodied in a cartridge design is the Type 2800 seal manufactured by John Crane, Inc. Other types of gas lubricated seals with spiraling grooves are disclosed in U.S. Pat. Nos. 4,423,879; 5,246,295; 5,385,409; 5,498,007 and 5,713,576. Other variations of gas lubricated seals are disclosed in an article entitled "*Analysis of Spiral-Groove Face Seal for Liquid Oxygen*" by Shapiro et al., published in ASLE Transactions, Volume 27, 3, pp. 177–188. Another type of non-contact gas seal marketed by A.W. Chesterton Co. as the 4400 TwinHybrid Gas Seal utilizes radially inward and outward sealing faces with the pressurized gas being supplied through the stationary ring and to circumferentially spaced elongate grooves spaced radially between the sealing faces.

While various types of double gas seals have been devised, the prior art has failed to effectively benefit from double gas seal technology. Prior art coplanar double gas seals do not provide effective lift off of both the radially outer sealing face and the radially inner sealing face under various conditions. Also, much of the prior art relating to double gas seals provide seal designs which are too large for many applications since the seals have a long axial length or require a considerable diametral space.

The disadvantages of the prior art are overcome by the present invention. An improved double gas seal is hereinafter disclosed which provides effective lift off of the radially spaced sealing faces and reliably seals pressurized fluid while minimizing seal wear.

SUMMARY OF THE INVENTION

A double gas pressure seal is provided for sealing between a stationary housing and a rotary housing within the stationary housing. The gas pressure seal includes a stationary ring and a rotary ring which cooperate to seal fluid within the stationary housing. In an exemplary application of the invention, the stationary housing may be a pump housing and the rotary housing may be a sleeve which is rotatable with the pump shaft. The double gas seal is supplied with pressurized gas from an external source and at a pressure higher than the pressure of the process fluid in the pump housing to reliably seal the process fluid.

Each of the stationary ring and the rotary ring has an annular inner sealing face and an annular outer sealing face, such that the inner and outer sealing faces are in sealing engagement. The phrase "sealing engagement" as used herein with respect to the sealing faces does not mean that the pad sealing faces are touching, and instead the faces are separated by a stiff gas film, as discussed more fully below, to achieve long seal life. A spring or other biasing member axially biases one of the stationary ring and rotary ring toward the other ring, and in a preferred embodiment biases the stationary ring toward the rotary ring. An annular groove is provided in one of the stationary ring and the rotary ring, with the annular groove being radially spaced between the inner sealing faces in sealing engagement and the outer sealing faces in sealing engagement. A supply port in one of the rings supplies the pressurized gas from an external source to the annular groove. A plurality of circumferentially spaced inner recesses and a plurality of circumferentially spaced outer recesses are each provided in one of the stationary ring and in the rotary ring, and preferably in the rotary ring. Each inner recess is spaced between the annular groove and a radially innermost portion of the inner sealing faces in sealing engagement, and each outer recess is spaced between the annular groove and a radially outermost portion of the outer sealing face is in sealing engagement. The plurality of inner recesses and the plurality of outer recesses exert a gas lift-off force on the axial movable one of the stationary ring and the rotary ring while providing a stiff pressurized gas film between the sealing faces. Each of the plurality of inner recesses and each of the plurality of outer recesses has a rotary leading portion and a circumferentially spaced rotary trailing portion. A plurality of inner feed channels and a plurality of outer feed channels fluidly connect the annular groove with the rotary leading portion of each inner recess and outer recess, so that the rotary trailing portion of each of the inner recesses and outer recesses is circumferentially spaced from the respective feed channel. In a preferred embodiment, each of the sealing faces lies within a single plane which is perpendicular to an axis of the rotating shaft.

It is an object of the invention to provide an improved gas seal with coplanar pad faces for sealing between a stationary housing and a rotary housing. A supply port in one of the stationary ring and rotary ring supplies pressurized gas to an annular groove. The pressurized gas then passes radially inward from the annular groove through a plurality of inner feed channels to a plurality of inner recesses, and similarly passes radially outward from the annular groove through a plurality of outer feed channels to a plurality of outer recesses. The circumferentially spaced inner and outer recesses provide the desired pressurized gas lift-off force which separates the stationary ring from the rotary ring while allowing a relatively small quantity of pressurized gas to leak from the gas pressure seal.

It is a feature of the invention that the double gas pressure seal may occupy a small axial and radial space and thereby be used in a large number of applications. It is a related feature of this invention that the gas pressure seal may be used over a wide range of external gas pressures and a wide range of fluid pressures within the stationary housing.

A significant advantage of the present invention is that the double gas pressure seal is relatively inexpensive and has a long life. The double gas pressure seal may be reliably used at elevated temperatures, and may be used to seal various types of fluids in the stationary housing, including abrasive, sticky, and corrosive fluids. The gas pressure seal also has the ability to relatively contain fluids within the stationary housing in the event that pressurized gas from the external source is temporarily lost, and the seal has the ability to return to normal operation after pressurized gas from the external source is restored.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
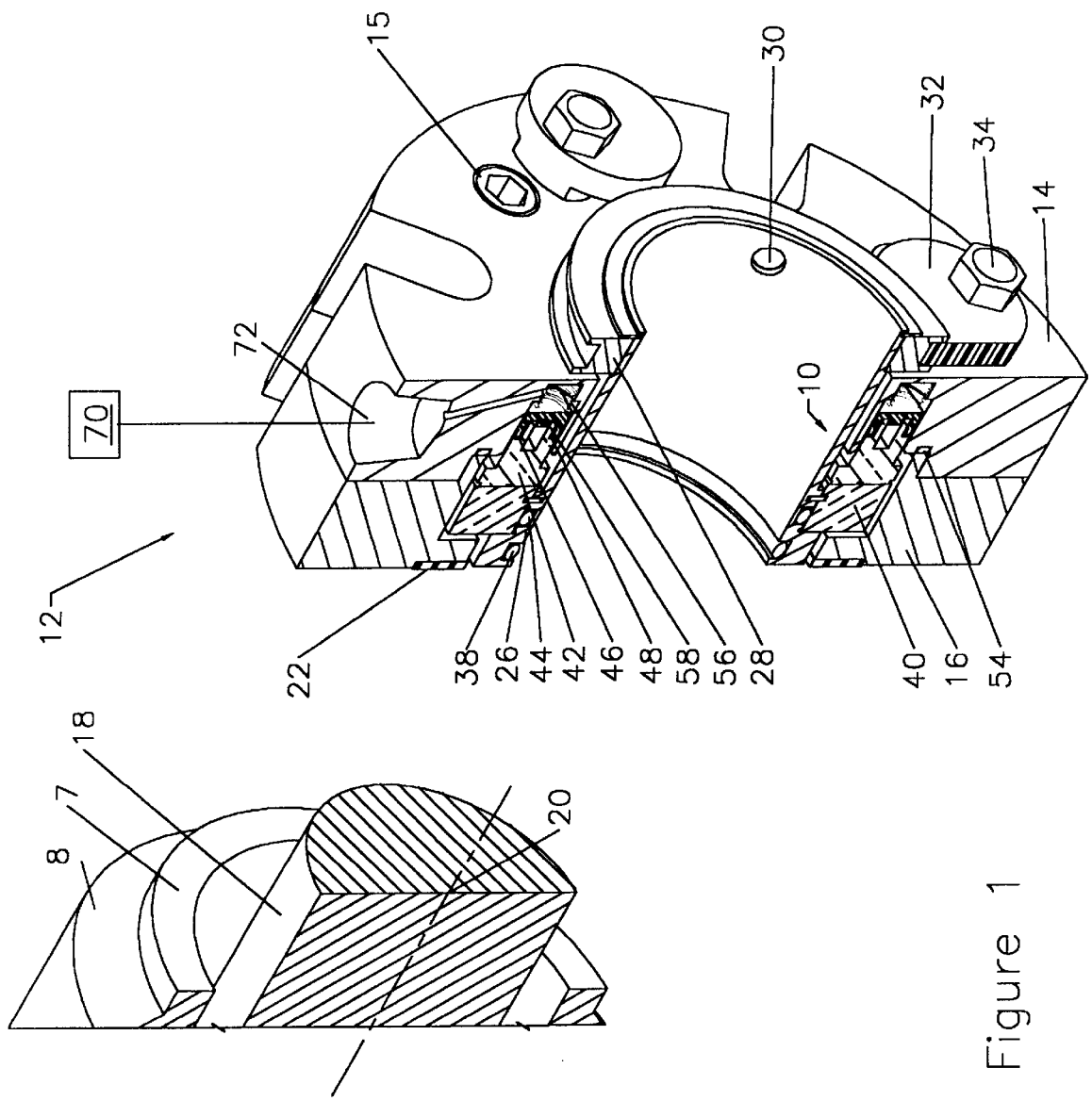
FIG. 1 is a cross-sectional isometric view of a portion of a pump housing and a seal housing according to the present invention, with a portion of the rotating pump shaft cut off before passing through the seal housing.

FIG. 1 illustrates one embodiment of the double gas pressure seal assembly 10 according to the present invention for sealing the fluid within a pump housing. In the depicted application, a stationary seal housing 12 includes an outer housing 14 and an inner housing 16. These housings may be structurally connected by a plurality of circumferentially spaced bolts 15, and may be disconnected to repair or replace the seal assembly 10. The pump includes a shaft 18 which rotates about axis 20 and extends through the housing 8 of the pump, with only a portion of the housing 8 shown in FIG. 1. Pressurized process fluid in the pump is sealed between pump housing 8 and the inner housing 16 of the seal assembly 16 by gasket 22. Gasket 22, which is secured to the inner housing 16, thus seals against the face 7 of the pump housing 8. Process fluid in the pump thus occupies the annular gap 24 (see FIG. 2) between an outer portion of the gas seal assembly 10 and both the inner housing 16 and the outer housing 14.

For the embodiment shown in FIG. 1, the rotary housing is a shaft sleeve 26, which rotates with the shaft 18. A conventional pump drive collar 28 includes circumferentially spaced ports 30 each for receiving a respective set screw (not shown) to secure the sleeve 26 to the shaft 18. A retaining ring 36 limits axial movement of the drive collar 28 with respect to the sleeve 26. A plurality of circumferentially spaced centering disks 32 each secured to the outer housing 14 by a respective bolt 34 may be adjusted to properly center the axis 20 of the shaft 18 within the housing 12, and may apply a desired prealignment to the drive collar 28 and thus to the shaft sleeve 26. A static seal, such as o-ring 38, may provide the seal between the shaft 18 and the sleeve 26. It should be understood that the terms "stationary housing" and "rotary housing" as used herein are broadly intended to refer to any stationary component and rotary component which include a seal assembly as described subsequently for sealing between these components during normal operation of the equipment. While the seal assembly 10 of the present invention is particularly well suited for sealing process fluid within a pump housing, the double gas seal of the present invention may be used in various applications for sealing between a stationary component and a rotary component. Exemplary equipment which may benefit from the seal assembly of this invention includes pumps and blower fans used in various operations, including chemical processing, hydrocarbon processing, and pulp and paper processing. The double gas seal of the present invention may be reliably used to seal various fluids within the equipment, including toxic fluids, with no appreciable discharge of the fluids from the equipment. All such fluids to be sealed within the equipment by the seal assembly of this invention are generally referred to herein as "process fluids".

Figure 2:
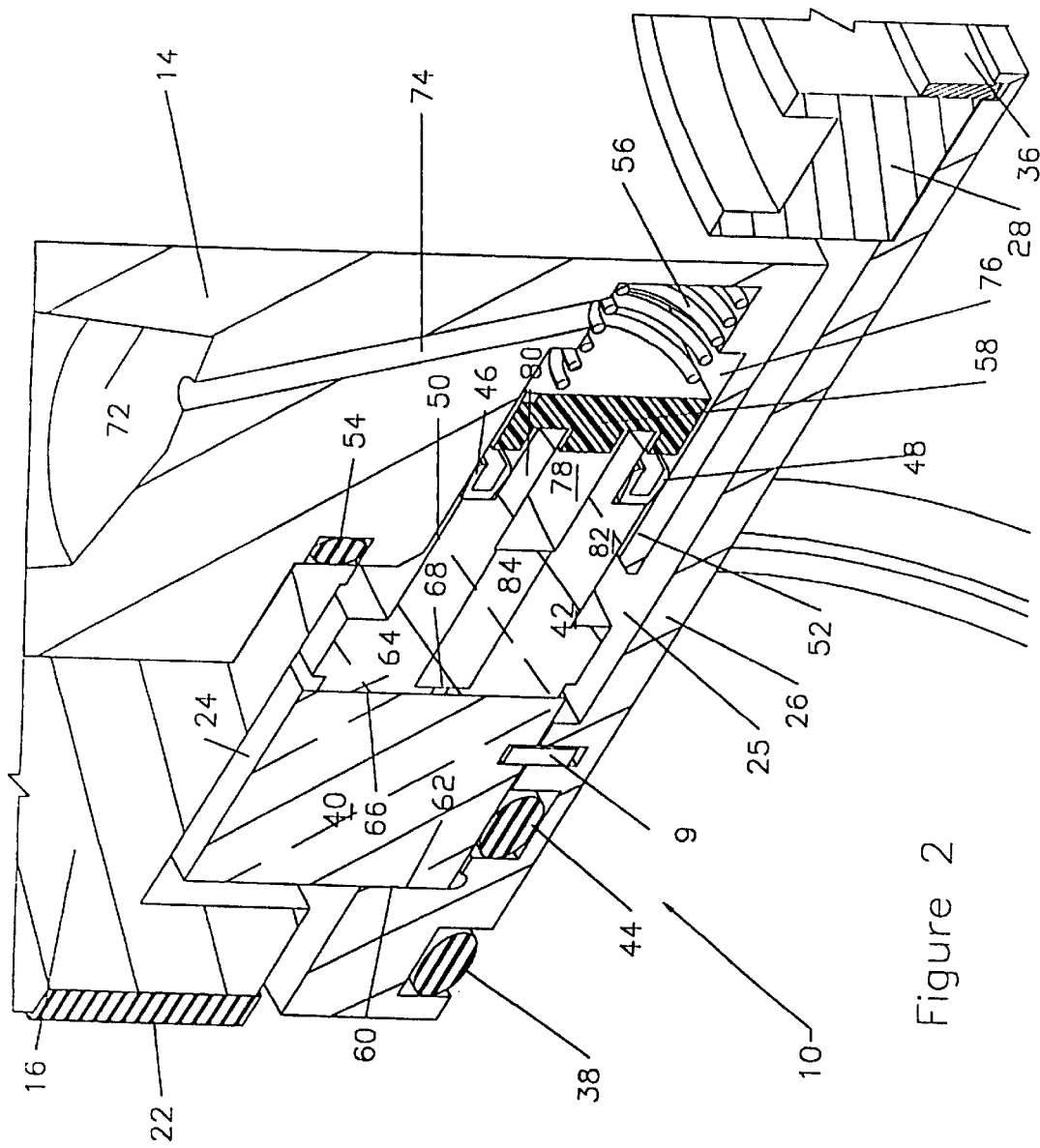
FIG. 2 is an enlarged cross-sectional isometric view of a portion of the seal housing as shown in FIG. 1, and illustrating one embodiment of a double gas seal in accordance with the present invention.

Referring now to FIGS. 1 and 2, the gas pressure seal 10 includes a rotary ring 40 and a stationary ring 42. The rotary ring 40 rotates with the sleeve 26 and is interconnected thereto by a suitable retainer, such as pins or a retaining ring 9. If there is a loss of pressurized gas to the gas pressure seal assembly 10, item 9 maintains the rotary ring 40 in position and, in the FIG. 1 illustration, stops movement of the ring 40 to the right. The item 9 is thus important to prevent overload between the stationary ring 42 and the rotary ring 40, thereby preventing excessive heat buildup in the seal assembly. The stationary ring 42 is similarly rotatably secured by pins (not shown) extending through drive ring 58 to the outer housing 14. A static seal, such as o-ring seal 44, seals between the rotary ring 40 and the sleeve 26. A pair of pressure responsive cup-shaped seals 46 and 48 each seal between the stationary ring 42 and the outer cylindrical surface 50 and the inner cylindrical surface 52, respectively, on the outer stationary housing 14. Another static o-ring seal 54 seals between the outer housing 14 and the inner housing 16.

A coil spring or other suitable biasing member 56 is provided in the outer housing 14 and acts on the drive ring 58, which in cross-section may have a substantially E-shaped configuration. The drive ring 58 in turn acts on the stationary ring 42, which then presses the end surface 60 of the rotary ring 40 into contact with the surface 62 on the shaft sleeve 26. As the ring 40 rotates with respect to the stationary ring 42, pressurized fluid in the pump housing is sealed between the planar face 64 on the rotary ring 40 and the planar face 66 on the stationary ring 42. During normal operation, the faces 64 and 66 are not actually in physical contact, but instead are separated by a slight gap, typically less than 0.0001 inches, which is the gap caused by the gas film which separates these faces. The stationary ring 42 includes an annular groove 68 which is discussed in further detail below. For the present, however, it should be understood that the faces 64 and 66 thus form annular inner sealing faces radially inward of the annular groove 68, and similarly form annular outer sealing faces radially outward of the annular groove 68. Each of these sealing faces lies within a plane perpendicular to the axis 20, and preferably both the radially inner and radially outer portions of both faces 64 and 66 lie within a single plane perpendicular to the axis 20.

Figure 3:
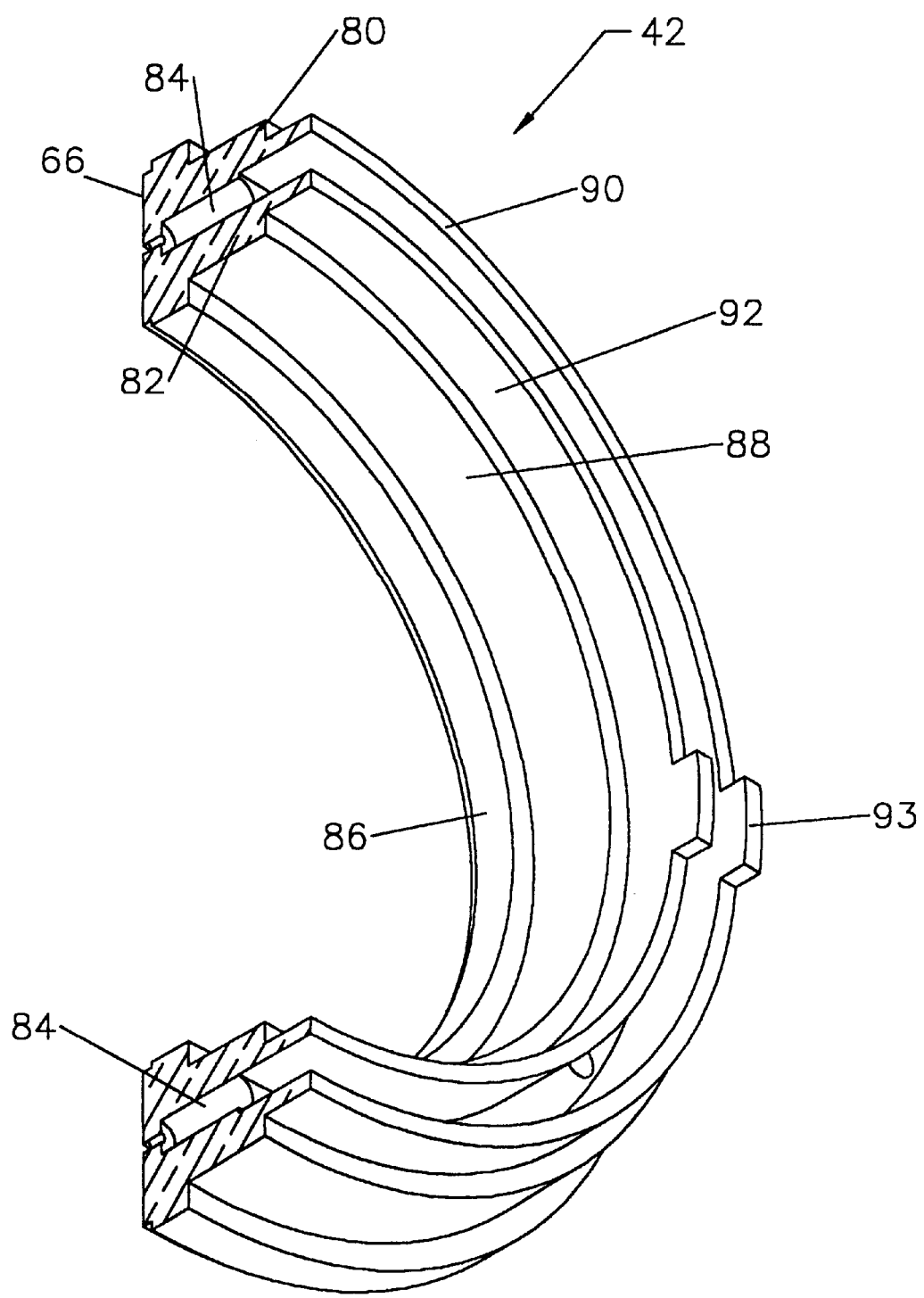
FIG. 3 is cross-sectional isometric view of the stationary ring shown in FIG. 2.

Referring still to FIGS. 1 and 2, pressurized gas, and preferably an inert gas such as nitrogen, may be supplied from an external source, such as supply cylinder 70. The pressurized gas is supplied to the input port 72 in the outer housing 14 and is transmitted through drilled passageway 74 to the annular cavity 76 in the stationary housing 14. Pressurized gas thus flows by the drive ring 58 and into the annular cavity 78 in the stationary ring 42 which is spaced between the outer annular leg 80 and the inner annular leg 82 of the stationary ring. A plurality of circumferentially spaced drilled supply ports 84 as shown in FIG. 3 provide fluid communication between the cavity 78 and the annular groove 68. The cross-section through FIG. 3 illustrates two such circumferentially spaced ports 84, while the radial position of one of the ports is shown in dashed lines in FIG. 2. Pressurized gas is thus continually provided to the annular groove 68, and this gas pressure is maintained at a pressure higher than the anticipated process fluid pressure within the pump housing 8. This inert gas pressure thus also energizes the cup shaped seals 46 and 48 to provide a reliable seal between the stationary ring 42 and the outer housing 14.

The rotary ring 40 may be manufactured from the relatively hard material, such as silicon carbide, while the stationary ring 42 may be manufactured from a more flexible material, such as carbon. Referring to FIG. 3, the cross-sectional configuration of the stationary ring 42 is controlled such that the radially thickest portion 86 of this component is closely adjacent the face 66. The axial spacing between the face 66 and the portion 86 is thus less than 0.050 inches, and preferably less than 0.040 inches. Moving axially further away from the face 66, the radial thickness of the stationary ring 42 thereafter is reduced to form the reduced width portion 88. The axial length of the portion 86 is from 0.100 inches to 0.150 inches, and preferably about 0.120 inches. The radial thickness of the portion 86 is preferably from 100% to 115% of the radial thickness of the sealing face 66, and preferably is about 105% to 115% of the radial thickness of the sealing face 66. The portion 88 preferably has a radial thickness of about 70% to 90% of the radial thickness of the sealing face 66, and preferably has a radial thickness of about 80% of the sealing face. The annular cavity 78 extends into the portion 88 and thus defines the outer leg 80 and inner leg 82 discussed above. Moving further away from the face 66, the thickness of each of the legs 80 and 82 is further restricted to form the relatively thin annular extensions 90 and 92 which are configured to receive the seals 46 and 48. The axial depth of the annular groove 78 may be controlled to provide a desired radial deflection capability for the legs 80 and 82 so that these legs may deflect in response to a radial pressure differential and thereby maintain a desired angular alignment between the stationary ring face 64 and the stationary housing face 66. The annular groove 78 extends axially into the portion 88, and preferably extends into at least 20%, and preferably from about 25% to 35%, into the axial length of the portion 88. The circumferentially spaced ports 84 have no appreciable effect on the flexibility of the portion 86. The recesses or pad faces themselves preferably should stay relatively flat and parallel. The tabs 93 are provided to fix the rotational position of the ring 42 in place.

Figure 4:
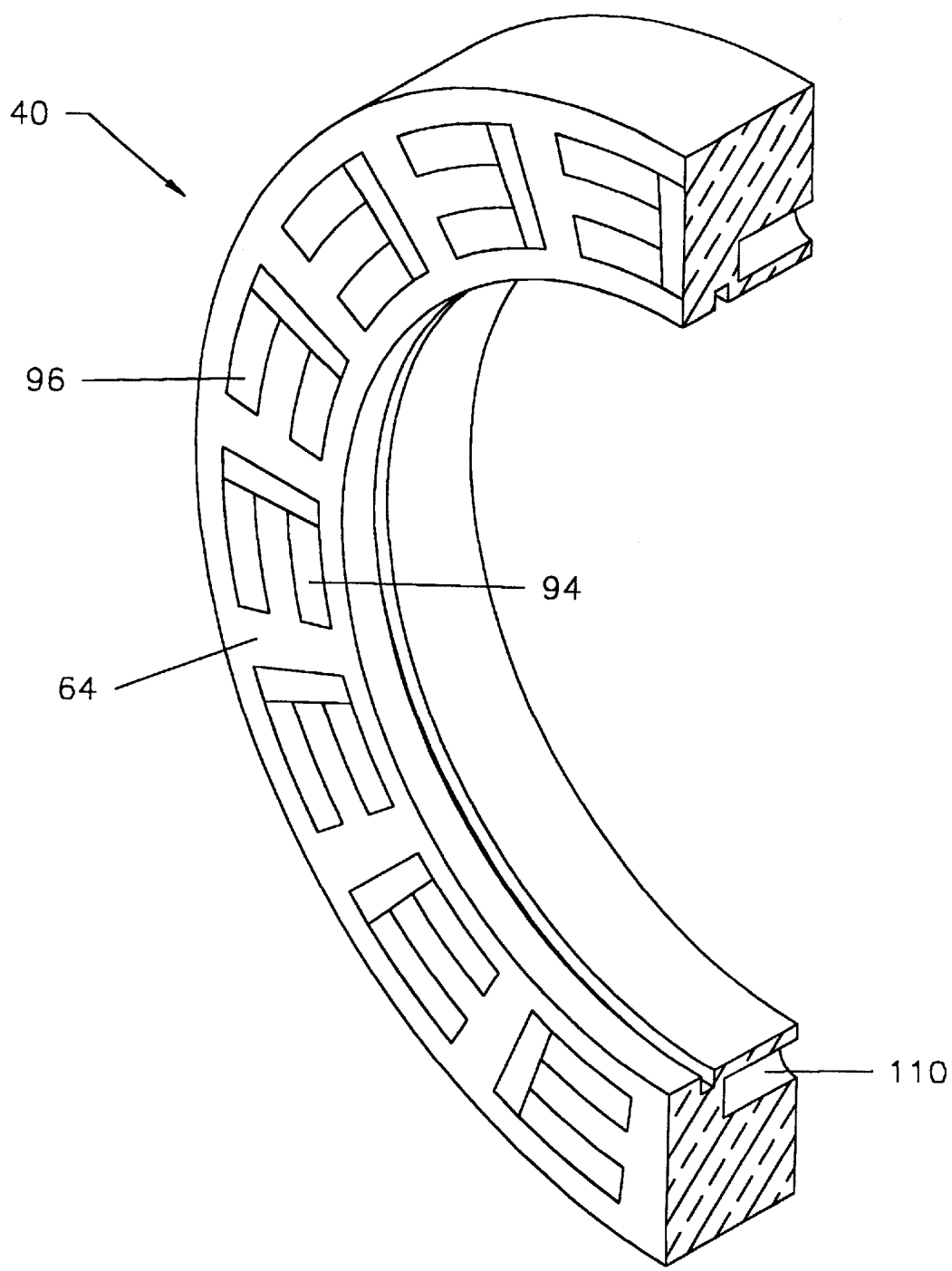
FIG. 4 is a cross-sectional isometric view of the rotary ring shown in FIG. 2.
Figure 5:
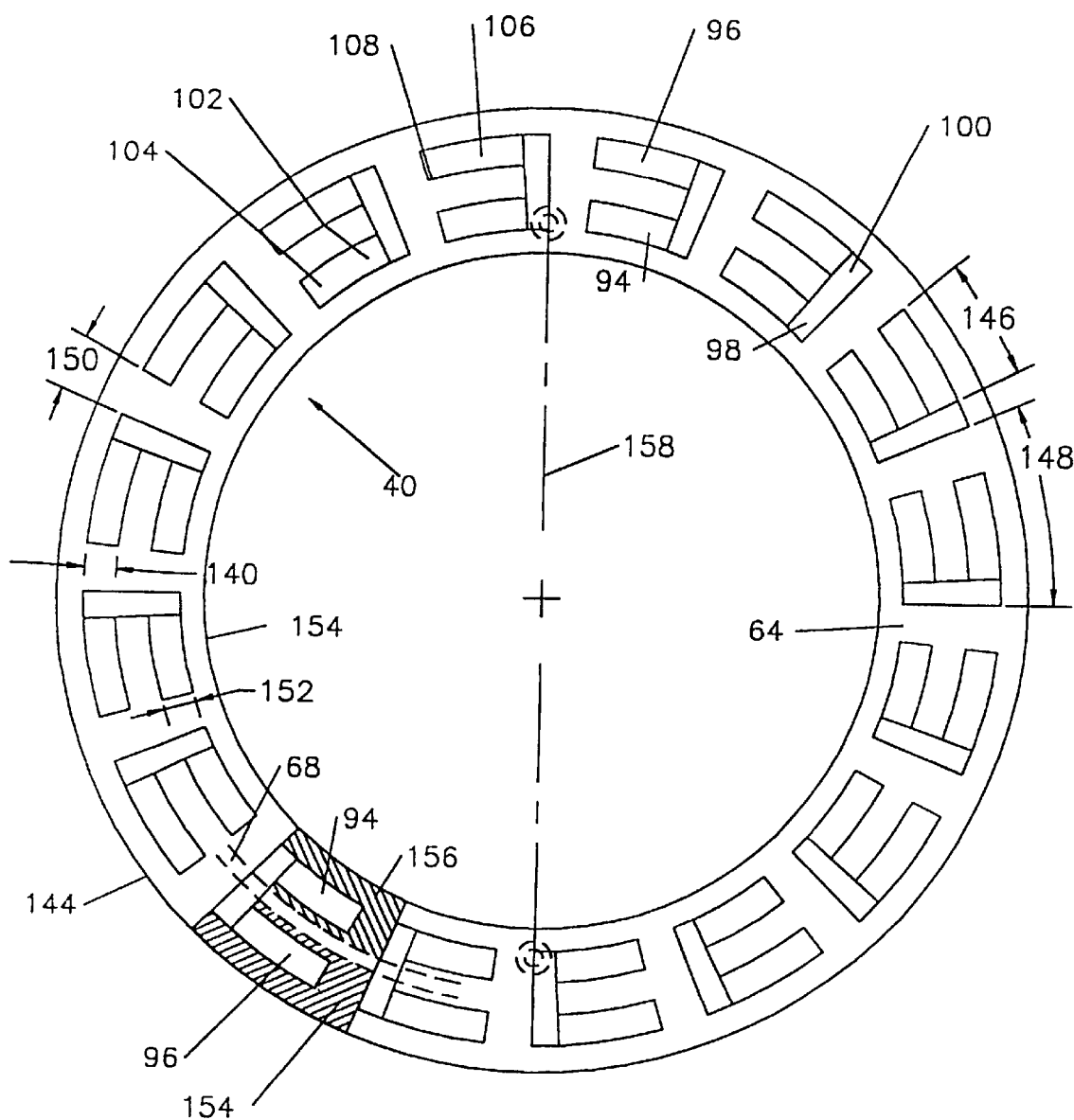
FIG. 5 is an end view of the rotary ring shown in FIG. 2, illustrating the plurality of inner recesses, the plurality of outer recesses, and the plurality of feed channels.

FIGS. 4 and 5 illustrate the plurality of circumferentially spaced inner recesses 94 and the plurality of circumferentially spaced outer recesses 96 each provided in the end face 64 of the rotary ring 40. Each of these recesses is in fluid communication with the annular groove 68 by a respective one of the plurality of the inner feed channels 98 and the outer feed channels 100 which supply pressurized fluid to each respective recess. More particularly, each inner recess 94 includes a rotary leading portion 102 and a rotary trailing portion 104, and each outer recess 96 similarly includes a rotary leading portion 106 and a rotary trailing portion 108. As shown in FIG. 5, the rotary ring 40 is thus intended for rotation in the clockwise direction. A plurality of circumferentially spaced holes 110 as shown in FIG. 4 may be provided in the rotary ring 40, with each hole 110 being sized to receive a suitable pin or other securing member to rotatably lock the rotary ring 40 to the sleeve 26.

By supplying the pressurized gas to the annular groove 68 and then through the feed channels to the plurality of recesses or pads 94 and 96, it should be understood that the pressurized gas, which is sometimes referred to as a buffer gas, is supplied between the two sealing faces 64 and 66. This gas may thus slowly leak radially outward to the annular gap 24 which is fluidly in communication with the process side of the equipment, while the pressurized gas also slowly leaks radially inward to the annular gap 25 between the stationary ring 42 and the sleeve 26, with the gap 25 being vented to atmosphere. Since the process fluid is maintained radially outward of the sealing faces 64 and 66, process fluid contamination of the sealing faces is minimized.

The double gas coplanar sealing faces 64 and 66 as shown in FIG. 2 provide two distinct coplanar sealing faces, with each of these faces preferably being within a single plane which is perpendicular to the axis 20 of the rotary sleeve 26. Both the stationary sealing Face 66 and the rotary sealing face 64 thus have a radially inward and a radially outward component, i.e., one sealing face radially inward of the groove 68 and another sealing face radially outward of the groove 68. Since each ring has both a radially inward and a radially outward sealing face, interaction between the inner and outer sealing faces thus occurs whenever there is deflection in one of the faces. This configuration desirably provides a reduced space for the coplanar gas seal, and the parts of the seal are configured for easy replacement.

By providing the pads or recesses on both an inner portion and an outer portion of the sealing faces, two different gas seals are effectively provided with the inner seal being an outside pressurized seal and the outer seal being an inside pressurized seal. The recesses or pad faces are configured to cause the external gas pressure to distribute itself across the seal faces so that a film of the desired "stiffness'is achieved to keep the faces from touching while allowing the film thickness to reliably form the desired seal. The desired gas seal thus includes a gas film with a thickness between these faces so that, as the faces move closer together, the net force produced by the pressure on each face increases significantly.

The preferred design of the sealing faces and the circumferentially spaced recesses will depend upon the application. For many applications, however, the radial thickness between the annular groove and the radially innermost edge of the inner recess 94 will be about 80% of the radial thickness between the annular groove and the radially innermost portion of the inner sealing face. Similarly, the radial thickness between the annular groove and the radially outermost edge of the outer recess 96 will be about 80% of the radial thickness between the annular groove and the radially outermost portion of the outer sealing face.

In the event that the buffer gas pressure becomes less than the process pressure, i.e., the pressure in the chamber 78 is less than the pressure in the annular gap 24, a u-cup seal 46 intentionally will leak so that the process pressure increases the sealing effectiveness of the seal 48. At this time, the seal 46 effectively is performing no sealing function, but the desired sealing function is still maintained by the seal 48.

The inner and outer recesses 94 and 96 may either use step pads or tapered pads. In a step pad arrangement, the connecting channels 98 and 100 may each have a depth of approximately 400 microinches, and typically from about 350 to 450 microinches. Each of the inner and outer recesses 94 and 96 have a uniform depth of approximately 40% to 60% of the channel depth, i.e., typically from about 150 to 250 microinches, and preferably about 200 microinches. In the tapered pad arrangement, the radially extending channels 98 and 100 may each have a depth of approximately 400 microinches, but the recess depth is uniformly tapered from the feed channel to the end of the recess, so that the rotary leading portion 102 and 106 of each recess has a depth of approximately 400 microinches, while the rotary trailing portion 104 and 108 of each recess tapers to the pad face.

In order to obtain the desired lift by the circumferentially spaced inner and outer pads, each outer recess may have a radial width 140 of approximately 50% of the spacing between the annular groove 68 and the outermost portion 144 of the sealing face 64. The feed groove 100 may occupy approximately 15% of the tangential space between recesses, and the recess 96 itself may use approximately 60% of the tangential space between the recesses. As shown in FIG. 5, the tangential length 146 of the recess 96 is thus approximately 60% of the tangential length 148. Accordingly, the spacing 150 between the end of one recess 96 and the beginning of the next feed groove may be approximately 25% of the tangential spacing 148. The inner pad 94 is similarly proportioned. The inner pad radial width 152 is thus approximately 50% of the spacing between the annular groove 68 and the innermost portion 155 of the sealing face 64. The plurality of inner recesses 94 and the plurality of outer recesses 96 define an area which is a significant portion of the total area between the annular groove 68 and the radially innermost portion 155 and the radially outermost portion 144 of the sealing face 64, respectively. FIG. 5 illustrates an outer sealing face area 154 radially outward of the groove 68 and an inner sealing face area 156 radially inward of the groove 68. The stiff gas film layer between the faces 64 and 66 thus fills these spaces 154 and 156 for each tangential length 148. The area of pad or recess 96 is at least 25% of the area 154, and preferably is at least 30% of the area 154. The area of pad or recess 94 is similarly at least 25% and preferably at least 30% of the area 156.

Figure 6:
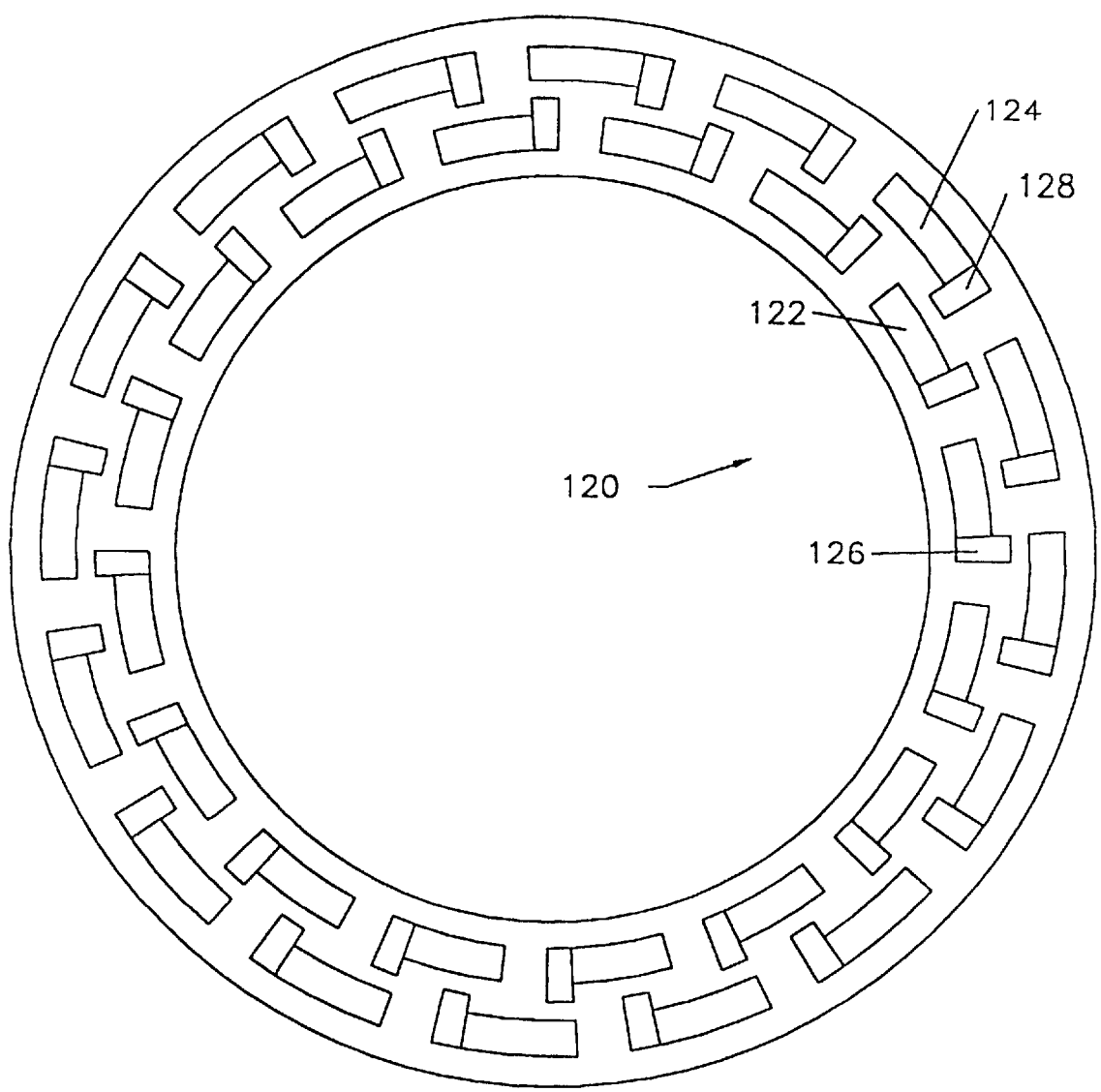
FIG. 6 is an end view of an alternate embodiment of a rotary ring according to the present invention.

FIG. 6 illustrates another embodiment of the invention, wherein the rotary pad 120 includes a plurality of circumferentially spaced inner recesses 122 and a plurality of circumferentially spaced outer recesses 124. Inner feed channels 126 extend between the annular groove and each respective inner recess, while similar outer feed channels 128 provide fluid communication between the annular groove and each of the respective outer recesses.

In both of the embodiments shown in FIGS. 5 and 6, it is important that both the inner recesses and outer recesses are configured with respect to the feed channels so that the feed channels supply pressurized fluid to the leading portion of the recess and thus at a location circumferentially spaced from the trailing portion of the recess. When the recesses are provided on the rotary ring, the leading portion of each recess is obviously the first portion of the recess which intersects an imaginary line, while the trailing portion of each recess subsequently intersects this imaginary line. Since the ring as shown in FIG. 5 rotates in the clockwise direction, the leading portion 106 of the recess 96 thus first intersects the imaginary line 158, and the trailing portion 108 then passes by the line 158. Similarly, a rotary leading portion 102 of a recess 94 first passes by the line 158, followed by the portion 104 of that same recess 94. The rotation of the ring 40 thus compresses the gas in each of the recesses so that gas pressure in the trailing portion of each recess is higher than gas pressure in the leading portion of each recess. The plurality of inner and outer recesses could be provided on the stationary component rather than the rotary component, and in that case the leading portion of each recess is the portion of the recess which first becomes tangentially aligned with a point on the rotary ring, while the trailing portion of the recess thereafter becomes tangentially aligned with the same point on the rotary ring. The movement of the rotary ring with respect to the recess thus still pulls the pressurized gas from the rotary leading portion of the recess to the rotary trailing portion of the recess, thus increasing gas pressure in the rotary trailing portion of the recess. Regardless of whether the recesses are provided on the rotary ring or the stationary ring, supplying the pressurized gas from the feed channels to the rotary leading portion of each recess ensures that pressure in the trailing portion of that recess will desirably increase to maintain the desired lifting effect and thus maintain the desired stiff film to achieve reliable sealing with a minimum loss of buffer gas.

By utilizing cup shaped seals 46 and 48 rather than o-ring seals, reliable gas leakage past the faces 64 and 66 may be more accurately maintained, thereby maintaining the desired film thickness between these faces 64 and 66. It has been determined that using the cup shaped seals 46 and 48 provides low friction to maintain a desired gas seal between the faces 64 and 66, and this desired reduced friction is not easily obtained with an o-ring seal. In part, the increased friction attributable to the use of o-ring seals rather than cup shaped seals may be due to expansion of the components as the pump heats up during continuous use.

In an alternate embodiment of the invention, the carbon ring has a reduced axial length from the previously described embodiment, thereby making the carbon ring more flexible in bending. An elongated rubber sleeve may then be provided between the metal drive ring and the stationary ring, so that the rubber sleeve axially separates the stationary ring and the drive ring and thereby provides a high degree of flexing between these components. The rubber sleeve may be compressed by the drive ring to transmit mechanical force to the stationary ring and then to the rotary ring, but does not affect the stiffness of the stationary ring. One of the problems with this embodiment is that the slightest tangential variation in Youngs modulus of the rubber may produce waves and thus dragging on the seal faces. Even small variations in the thickness of the rubber or the flatness of the mating surfaces may accordingly cause waves that may adversely affect the desired film thickness.

In yet another embodiment of the invention, an additional o-ring may be provided on the stationary ring and upstream from the cup shaped seals. This additional o-ring (not shown) would normally be provided on the exterior of the stationary ring 42 and out of contact and thus out of sealing engagement with the cylindrical surface 50. In the event that pressurized gas to the chamber 76 is lost, however, the location of the static o-ring 44 between the rotary ring 40 and the sleeve 26 would cause both the rotary ring 40 and the stationary ring 42 to move to the right, as shown in FIG. 2, thereby bringing the additional o-ring seal into sealing engagement with the surface 50. This additional o-ring would thus keep process fluid from leaking past the cup seal 46 and through the ports 84 and the annular groove 68 and then radially inward between the faces 64 and 66. Initial tests have indicated, however, that this design does not offer the same high reliability as the design shown in the figures, and the robustness of the gas seal assembly to reliably operate under various conditions is adversely affected. If gas pressure is lost, however, this latter design should experience lower leakage of process fluid from the gas seal to the environment, although this lower leakage also may result in higher heat generation in the area of the sealing faces 64 and 66.

In other embodiments, the biasing spring 56 may be eliminated, and the biasing force desired to press the axially movable one of the rings against the other ring may be provided by the external pressurized gas.

The feed channels that supply the pressurized gas to the recesses and the recesses may be provided on either the stationary ring or the rotary ring. In a preferred embodiment, both the feed channels and the recesses are provided on the rotary ring. Both the feed channels and the recesses are also preferably provided in the ring which is formed from the hardest material for the rotary ring and the stationary ring. If the faces briefly touch during operation of the equipment, some wear the sealing faces will occur. Also, if the external pressurized gas is briefly interrupted, some wear between the sealing faces will occur. Preferably the wear will thus be concentrated on the ring which does not include the specially formed recesses and feed channels. When the rotary ring 40 as disclosed herein is fabricated from silicon carbide material and contains both the recesses and the feed channels, wear between the faces will primarily occur on the softer carbon stationary ring, which may then be replaced while the more expensive silicon carbide rotary ring is reused.

The annular groove 68 may be provided on either the stationary ring or the rotary ring. The cost of forming the annular groove is nominal, however, and the groove 68 may be easily provided on the softer material ring. The ports which supply the pressurized gas to the annular groove are provided on the stationary ring.

Various other modifications to the gas seal and method of forming an improved seal will be apparent from the above description of the preferred embodiments. Although the invention has thus been described in detail for various embodiments, it should be understood that this is for illustration and the invention is not limited to the described embodiments. Alternate components and operating techniques will be apparent to those skilled in the art in view of this disclosure. Additional modifications are thus contemplated and may be made without departing from the spirit of the invention, which is defined by the following claims.

What is claimed is:

1. A double gas pressure seal for sealing between a stationary housing and a rotary housing, the gas pressure seal sealing process fluid within the stationary housing, the gas pressure seal comprising:
    a stationary ring having an annular stationary pad radially inner sealing face and an annular stationary pad radially outer sealing face;
    a rotary ring having an annular rotary pad radially inner sealing face for sealing engagement with the annular stationary pad radially inner sealing face and an annular rotary pad radially outer sealing face for sealing engagement with the annular stationary pad radially outer sealing face;
    an annular groove in a sealing face of one of the stationary ring and the rotary ring, the annular groove being spaced radially between the radially inner sealing faces and the radially outer sealing faces;
    a supply port in the stationary ring for supplying pressurized gas from an external source to the annular groove, the pressurized gas being at a pressure higher than the pressure of the process fluid within the stationary housing;
    a plurality of circumferential spaced radially inner recesses each in one of the stationary ring and the rotary ring, each inner recess being spaced radially between the annular groove and a radially innermost portion of the radially inner sealing faces for receiving the pressurized gas to exert a pressurized gas lift-off force on an axially moveable one of the stationary ring and the rotary ring, each of the plurality of inner recesses having a rotary leading portion and a circumferentially spaced rotary trailing portion;
    a plurality of circumferentially spaced radially outer recesses each in one of the stationary ring and the rotary ring, each radially outer recess being spaced radially between the annular groove and a radially outermost portion of the outer seal faces for receiving the pressurized gas to exert a pressurized gas lift-off force on of the axially moveable one of the stationary ring and the rotary ring, each of the plurality of outer recesses having a rotary leading portion and a circumferentially spaced rotary trailing portion;
    a plurality of inner feed channels in one of the stationary ring and the rotary ring, each inner feed channel fluidly connecting the annular groove to the rotary leading portion of a respective inner recess to supply pressurized fluid to the inner recess, such that the rotary trailing portion of the respective inner recess is circumferentially spaced from the respective inner feed channel; and
    a plurality of outer feed channels in one of the stationary ring and the rotary ring, each outer feed channel fluidly connecting the annular groove to the rotary leading portion of a respective outer recess to supply pressurized fluid to the outer recess, such that the rotary trailing portion of the respective outer recess is circumferentially spaced from the respective outer feed channel.

2. The double gas pressure seal as defined in claim 1, wherein each of the stationary pad inner sealing face, the stationary pad outer sealing face, the rotary pad inner sealing face and the rotary pad outer sealing face lies within a plane perpendicular to an axis of the rotating shaft.

3. The double gas pressure seal as defined in claim 2, wherein each of the sealing faces lies within a single plane perpendicular to the axis of the rotating shaft.

4. The double gas pressure seal as defined in claim 1, wherein the stationary ring is the axially moveable one of the stationary ring and the rotary ring.

5. The double gas pressure seal as defined in claim 1, wherein each of the plurality of the circumferentially spaced inner recesses and each of the plurality of circumferentially spaced outer recesses is provided on the rotary ring.

6. The double gas pressure seal as defined in claim 5, wherein each of the plurality of inner feed channels and each of the plurality of outer feed channels is provided on the rotary ring.

7. The double gas pressure seal as defined in claim 1, further comprising:
    a first seal for sealing between the rotary ring and the rotating housing;

a second seal for sealing between a radially outer surface of the stationary ring and the stationary housing; and a third seal for sealing between a radially inner surface of the stationary ring and the stationary housing.

8. The double gas pressure seal as defined in claim 1, wherein an axial depth of the rotary trailing portion of each of the plurality inner recesses and each of the plurality of outer recesses is less than an axial depth of the rotary leading portion of the corresponding recess.

9. The gas pressure seal as defined in claim 1, wherein the process fluid sealed in the stationary housing engages a radially outer surface of each of the stationary ring and the rotary ring, and wherein a radially inner surface of each of the stationary ring and the rotary ring is vented to atmosphere.

10. The double gas pressure seal as defined in claim 1, wherein each of the radially inner feed channels has an axial depth of 350 to 450 microinches, and each of the radially inner recesses has axial depth of from 150 to 250 microinches.

11. The double gas pressure seal as defined in claim 1, wherein the plurality of inner recesses defines an inner recess area of at least 25% of the inner sealing faces in sealing engagement.

12. The double gas seal as defined in claim 1, wherein the plurality of the outer recesses define an outer recess area of at least 25% of the outer sealing faces in sealing engagement.

13. A double gas pressure seal for sealing between a stationary housing and a rotary housing, the gas pressure seal sealing process fluid within the stationary housing, the gas pressure seal comprising:

a stationary ring having an annular stationary pad radially inner sealing face and an annular stationary pad radially outer sealing face;

a rotary ring having an annular rotary pad radially inner sealing face for sealing engagement with the annular stationary pad radially inner sealing face and an annular rotary pad radially outer sealing face for sealing engagement with the annular stationary pad radially outer sealing face;

a first seal for sealing between the rotary ring and the rotary housing;

a second seal for sealing between the stationary ring and the stationary housing;

a biasing member for axially biasing the stationary ring toward the rotary ring;

an annular groove in a sealing face of one of the stationary ring and the rotary ring, the annular groove being spaced radially between the radially inner sealing faces and the radially outer sealing faces;

a supply port in the stationary ring for supplying pressurized gas from an external source to the annular groove, the pressurized gas being at a pressure higher than the pressure of the process fluid within the stationary housing;

a plurality of circumferential spaced radially inner recesses each in the rotary ring, each inner recess being spaced radially between the annular groove and a radially innermost portion of the radially inner sealing faces, the pressurized gas in the plurality of inner recesses exerting a pressurized gas lift-off force on the stationary ring, each of the plurality of inner recesses having a rotary leading portion and a circumferentially spaced rotary trailing portion;

a plurality of circumferentially spaced radially outer recesses each in the rotary ring, each radially outer recess being spaced radially between the annular groove and a radially outermost portion of the outer seal faces, the pressurized gas in the plurality of outer recesses exerting a pressurized gas lift-off force on of the stationary ring, each of the plurality of outer recesses having a rotary leading portion and a circumferentially spaced rotary trailing portion;

a plurality of inner feed channels in one of the stationary ring and the rotary ring, each inner feed channel fluidly connecting the annular groove to the rotary leading portion of a respective inner recess to supply pressurized fluid to the inner recess, such that the rotary trailing portion of the respective inner recess is circumferentially spaced from the respective inner feed channel;

a plurality of outer feed channels in one of the stationary ring and the rotary ring, each outer feed channel fluidly connecting the annular groove to the rotary leading portion of a respective outer recess to supply pressurized fluid to the outer recess, such that the rotary trailing portion of the respective outer recess is circumferentially spaced from the respective outer feed channel; and the plurality of inner recesses and the plurality of outer recesses defining a area of at least 25% of the sealing faces in sealing engagement.

14. The double gas pressure seal as defined in claim 13, wherein each of the stationary pad inner sealing face, the stationary pad outer sealing face, the rotary pad inner sealing face and the rotary pad outer sealing face lies within a single plane perpendicular to an axis of the rotating shaft.

15. The double gas pressure seal as defined in claim 13, wherein each of the plurality of inner feed channels and each of the plurality of outer feed channels is provided on the rotary ring.

16. The gas pressure seal as defined in claim 13, wherein the process fluid sealed in the stationary housing engages a radially outer surface of each of the stationary ring and the rotary ring, and wherein a radially inner surface of each of the stationary ring and the rotary ring is vented to atmosphere.

17. The double gas pressure seal as defined in claim 13, wherein each of the radially inner feed channels and each of the plurality of outer feed channels has an axial depth of 350 to 450 microinches, and each of the radially inner recesses and each of the plurality of outer recesses has axial depth of from 150 to 250 microinches.

18. A double gas pressure seal for sealing between a stationary pump housing and a pump sleeve rotatable with a rotary pump shaft, the gas pressure seal sealing process fluid within the stationary pump housing, the gas pressure seal comprising:

a stationary ring having an annular stationary pad radially inner sealing face and an annular stationary pad radially outer sealing face;

a rotary ring having an annular rotary pad radially inner sealing face for sealing engagement with the annular stationary pad radially inner sealing face and an annular rotary pad radially outer sealing face for sealing engagement with the annular stationary pad radially outer sealing face;

a biasing member for axially biasing an axially movable one of the stationary ring and the rotary ring toward the other of the stationary ring and the rotary ring;

an annular groove in a sealing face of one of the stationary ring and the rotary ring, the annular groove being spaced radially between the radially inner sealing faces and the radially outer sealing faces;

a supply port in the stationary ring for supplying pressurized gas from an external source to the annular groove, the pressurized gas being at a pressure higher than the pressure of the process fluid within the stationary housing;

a plurality of circumferential spaced radially inner recesses each in one of the stationary ring and the rotary ring, each inner recess being spaced radially between the annular groove and a radially innermost portion of the radially inner sealing faces for receiving the pressurized gas to exert a pressurized gas lift-off force on the stationary ring, each of the plurality of inner recesses having a rotary leading portion and a circumferentially spaced rotary trailing portion;

a plurality of circumferentially spaced radially outer recesses each in one of the stationary ring and the rotary ring, each radially outer recess being spaced radially between the annular groove and a radially outermost portion of the outer seal faces for receiving the pressurized gas to exert a pressurized gas lift-off force on of the stationary ring, each of the plurality of outer recesses having a rotary leading portion and a circumferentially spaced rotary trailing portion;

a plurality of inner feed channels in one of the stationary ring and the rotary ring, each inner feed channel fluidly connecting the annular groove to the rotary leading portion of a respective inner recess to supply pressurized fluid to the inner recess, such that the rotary trailing portion of the respective inner recess is circumferentially spaced from the respective inner feed channel; and a plurality of outer feed channels in one of the stationary ring and the rotary ring, each outer feed channel fluidly connecting the annular groove to the rotary leading portion of a respective outer recess to supply pressurized fluid to the outer recess, such that the rotary trailing portion of the respective outer recess is circumferentially spaced from the respective outer feed channel.

19. The double gas pressure seal as defined in claim 18, wherein:

each of the plurality of the circumferentially spaced inner recesses and each of the plurality of circumferentially spaced outer recesses is provided on the rotary ring; and each of the plurality of inner feed channels and each of the plurality of outer feed channels is provided on the rotary ring.

20. The gas pressure seal as defined in claim 18, wherein the process fluid sealed in the stationary pump housing engages a radially outer surface of each of the stationary ring and the rotary ring, and wherein a radially inner surface of each of the stationary ring and the rotary ring is vented to atmosphere.

* * * * *